Oct. 12, 1965 E. N. KAUFMAN 3,211,897
ANALOGUE-TO-DIGITAL CONVERTER
Filed Sept. 26, 1961
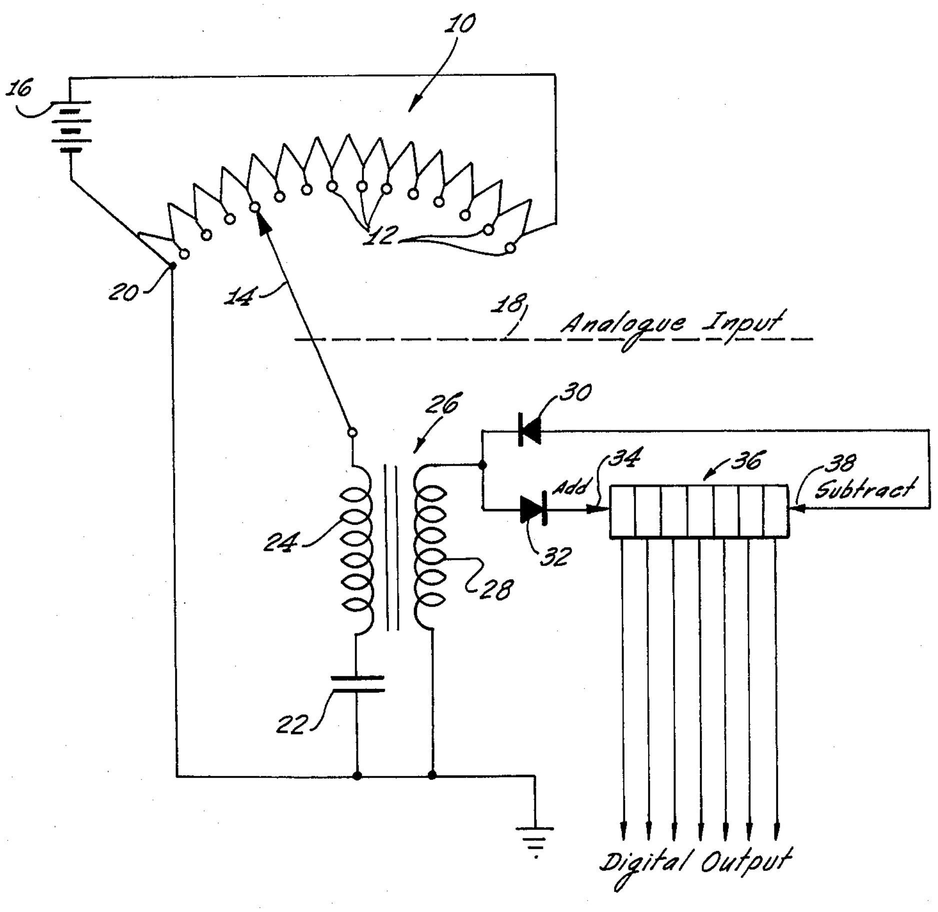
INVENTOR:
Edwin N. Kaufman
By Richard Fentress
Agent 3,211,897
Patented Oct. 12, 1965

3,211,897

ANALOGUE-TO-DIGITAL CONVERTER

Edwin N. Kaufman, Los Angeles, Calif., assignor to Litton Systems, Inc., Beverly Hills, Calif.

Filed Sept. 26, 1961, Ser. No. 140,844
1 Claim. (Cl. 235—154)

This invention relates to binary transducers, and more particularly, is concerned with an analogue-to-digital converter, especially useful in combination with relatively weak mechanical inputs to obtain a digital readout.

Numerous transducers have been suggested for changing analogue input signals representing magnitudes such as pressure, temperature or shaft position into binary coded information. In mechanical arrangements, where powerful inputs are available, such as odometers, satisfactory results are easily obtained. However, with weak input systems, electronic techniques are preferred to avoid unnecessary loading of the input force. Among the shortcomings of prior art electronic transducers, the comparatively complicated circuitry should be noted, which results in high costs with respect to manufacture, maintenance, and repair, as well, accordingly, the main objects of the present invention include improvement and simplification of transducers of the type under consideration.

In accordance with the invention, an analogue-to-digital converter includes circuitry for providing a stepwise variable potential representing the analogue input, and this potential is employed for producing a single current pulse upon any step changing the potential level. The polarity of the pulse indicates the direction of potential change. Thus, one polarity represents a potential increase, and the opposite polarity indicates a potential decrease. The pulses are separated in accordance with their polarity, and the sequency of pulses of one polarity is applied to the "ADD" input of a digital counter, while pulses of the other polarity are applied to the "SUBTRACT" input of the counter. The output from the counter then constitutes a digital readout of the analog input mentioned above.

In accordance with an important feature of this invention, the variable potential level which changes, as mentioned above, by discrete steps, is applied to a capacitor, so that, when the steps is associated with a potential increase, a charging current pulse is applied to the capacitor. On the other hand, when a potential decrease is involved, the capacitor discharges, producing an oppositely directed discharging current pulse. Further features of the invention include a transformer having its primary connected in the charging-discharging circuit of the capacitor, circuitry for separating pulses of one polarity from pulses of the other polarity, using a pair of oppositely poled rectifiers, and the "up-down" or reversible digital counter mentioned above having its "ADD" input connected to the output of one rectifier and its "SUBTRACT" input connected to the output of the other rectifier.

The invention will be more easily understood from a consideration of the following detailed description and the accompanying drawing in which the single figure is a circuit diagram of one embodiment of an analogue-to-digital converter according to the invention.

Referring to the drawing, the converter includes a potentiometer 10, which may be a conventional resistance wire potentiometer, modified to have spaced taps 12 at discrete voltage levels and a brush or sliding contact 14 engaging the taps 12. Other equivalent devices using a sweeping contact and, for example, including a resistive layer applied to a film may be employed, provided that the contact engages the layer at discrete voltage levels. A constant voltage is applied to potentiometer 10 from a direct current source, such as battery 16.

The wiper arm 14 is mechanically driven by a force representing the analogue input to the system, as indicated by the broken line 18. At this point it should be noted that a relatively low force is required for adjusting the wiper arm of conventional instruments of this type. Generally speaking, the magnitude represented by the wiper arm position can be of any desired nature such as, for example, the mechanical output from a thermometer or a pressure measuring apparatus, for example.

As shown in the drawing, the potential drop between the lefthand terminal 20 of potentiometer 10 and wiper arm 14 is applied to a capacitor 22 with primary 24 of a transformer 26 connected in series into the circuit. Considering that a constant potential difference is applied to terminals 16, it will be clear that when wiper arm 14 is shifted one step to the right as shown in the drawing to contact the next adjacent tap 12, such a step involves a potential increase applied to capacitor 22, which incremental potential increase is accompanied by a charging current pulse of very short duration. On the other hand, a similar incremental step toward a lower potential is involved when the wiper arm 14 is shifted toward the left to contact the adjacent tap at a lower potential level. Such movement of the wiper arm 14 results in a discharging current pulse having a polarity which is opposite with respect to that of the charging pulse.

At this point it should be noted that the total resistance of potentiometer 10 as well as the resistance value between taps is not critical. However, it will be apparent that the number of taps determines the resolution of the transducer, and therefore, the sensitivity of the system. In some typical instances, a resolution of one part in one thousandth has been found satisfactory. This relationship represents an accuracy of 0.1%.

It will be understood, that the pulses appearing across the secondary 28 of transformer 26 represent signals indicating incremental changes in wiper position, with the pulse polarity depending upon the direction of potential change toward either a higher level or a lower level. Pulses of one polarity are separated from pulses of the other polarity by means of a pair of oppositely poled rectifiers 30 and 32. The output from rectifier 32 is applied to the "ADD" input 34 of a reversible binary digital counter 36, while the output from rectifier 30 is applied to the "SUBTRACT" input terminal 38 of the counter.

In operation, and assuming that wiper arm 14 is rotated clockwise under the action of an analogue input 18 to contact the next tap 12 adjacent a charging current pulse passing through primary 24 is applied to capacitor 22. The corresponding current pulse appearing in secondary 28 has such polarity that it passes through rectifier 32 which is poled to be conductive with respect to such pulse direction. Accordingly, the pulse is applied to the "ADD" terminal 34 of the binary counting circuit to increase the stored number by one digit. An identical command is applied to the binary counter in any instance when the arm moves from any one tap 12 to the adjacent tap representing a higher potential by clockwise rotation. No input signals are applied to the "SUBTRACT" counter input 38 since charging pulses are blocked by recifier 30.

When the wiper arm displacement occurs in a counterclockwise direction, its sweeping contact engages a tap corresponding to a power potential than that of the capacitor at the specific moment, so that the capacitor discharges to this lower level. The discharging pulse through primary 24 induces a "SUBTRACT" signal in secondary 28, through rectifier 30. This pulse is applied to terminal 38, because rectifier 30 is conductive with respect to this pulse polarity, while rectifier 32 blocks the pulse and no signal is applied to the "ADD" input 34. Thus, it can be seen that the analogue input signal applied to the wiper arm 14 is translated into a series of "ADD" or "SUBTRACT" pulses to the binary digital counter, wiht the inversely poled rectifiers selectively applying the signals either to the "ADD" or to the "SUBTRACT" input, depending upon the pulse polarity. In other word, the input signals are combined in the counter to form a digital output representing the algebraic sum of all pulses applied to both inputs at the end of any given time period.

The reversible binary digital counter 36 therefore continuously represents the analogue input signal. Counters of this type using bistable multivibrators, cores, or other known components are well known in the art, and therefore, need not be described in detail.

As stated above, the resistance element of the potentiometer may be of the type employing a wound resistance wire or any equivalent. With respect to the capacitor, a low leakage type has been found suitable.

It is to be understood that the above-described arrangements are illustrative of the application of the principles of the invention. Numerous other arrangements may be devised by those skilled in the art without departing from the spirit and scope of the invention. Thus, by way of example and not of limitation, the analogue input itself, although it involves a mechanical movement of the wiper arm, may be moved by an electromagnetic actuator, or a temperature-controlled bimetal strip. In addition, a decade counter could be employed instead of a binary counter. Accordingly, from the foregoing remarks, it is to be understood that the present invention is to be limited only by the spirit and scope of the appended claim.

What is claimed is:

In an analogue-to-digital converter, a potentiometer having a plurality of spaced taps and a wiper arm selectively engaging one of the taps, means for mechanically adjusting the wiper arm position in accordance with an analogue input signal, a capacitor connected across the tapped portion of the potentiometer for producing a pulse upon a change in wiper position from one to an adjacent tap, with each pulse of one polarity charging the capacitor and each pulse of the opposite polarity discharging the capacitor, a transformer having its primary connected in series with the capacitor, a reversible binary digital counter having "ADD" and "SUBTRACT" inputs, and means including a pair of oppositely poled rectifiers for selectively applying the transformer secondary output to either of the counter inputs with capacitor charging pulses energizing the "ADD" input and capacitor discharging pulses energizing the "SUBTRACT" input.

References Cited by the Examiner

UNITED STATES PATENTS

| | | | |
|---|---|---|---|
| 2,896,198 | 7/59 | Bennett | 235—154 |
| 2,903,185 | 9/59 | Myers. | |
| 3,050,718 | 8/62 | Giel | 340—347 X |

MALCOLM A. MORRISON, *Primary Examiner.*